United States Patent [19]

Murphy et al.

[11] Patent Number: 4,809,099

[45] Date of Patent: * Feb. 28, 1989

[54] TRANSPORT FOR TAPE CARTRIDGE WITH LEADER BLOCK

[75] Inventors: John F. Murphy, San Diego; William M. Barton, Jr., Encinitas; Lynn C. Jacobs, Fremont; Jeffrey S. McGee, San Diego; William F. Netzeband, San Diego; Roger S. Johnson, Del Mar; Thomas J. Dinas, San Diego, all of Calif.

[73] Assignee: Cipher Data Products, Inc., San Diego, Calif.

[*] Notice: The portion of the term of this patent subsequent to Nov. 3, 2004 has been disclaimed.

[21] Appl. No.: 195,408

[22] Filed: May 16, 1988

Related U.S. Application Data

[63] Continuation of Ser. No. 88,729, Aug. 24, 1987, which is a continuation of Ser. No. 794,503, Nov. 1, 1985, Pat. No. 4,704,645.

[51] Int. Cl.$^4$ .................. G11B 5/008; G11B 15/32
[52] U.S. Cl. .................................. 360/95; 360/93; 226/92
[58] Field of Search .............................. 360/90, 93, 95; 242/195–197; 226/91–92

[56] References Cited

U.S. PATENT DOCUMENTS

| | | | |
|---|---|---|---|
| 3,951,357 | 4/1976 | Yamada et al. | 242/54 |
| 4,023,748 | 5/1977 | Burdorf | 242/192 |
| 4,125,881 | 11/1978 | Eige et al. | 360/50 |
| 4,161,004 | 9/1978 | Dalziel | 360/106 |
| 4,196,873 | 4/1980 | Kudoh | 242/195 |
| 4,334,656 | 6/1982 | Crawford et al. | 242/195 |
| 4,335,858 | 6/1982 | Cranna | 242/195 |
| 4,383,660 | 5/1983 | Richard et al. | 242/197 |
| 4,399,936 | 8/1983 | Rueger | 242/195 X |
| 4,426,047 | 1/1984 | Richard et al. | 242/197 |
| 4,452,406 | 6/1984 | Richard | 242/195 |
| 4,477,851 | 10/1984 | Dalziel et al. | 226/91 X |
| 4,500,965 | 2/1985 | Gray | 364/400 |
| 4,555,077 | 11/1985 | Platter et al. | 242/198 |
| 4,608,614 | 8/1986 | Rinkleib et al. | 360/95 |
| 4,646,177 | 3/1987 | Sanford et al. | 360/95 |
| 4,679,747 | 7/1987 | Smith | 242/195 |
| 4,742,407 | 5/1988 | Smith et al. | 360/95 |

FOREIGN PATENT DOCUMENTS 0143598 6/1985 European Pat. Off. .
59-140662 8/1984 Japan .
WO83/04453 12/1983 PCT Int'l Appl. .

Primary Examiner—John H. Wolff
Attorney, Agent, or Firm—Baker, Maxham & Jester

[57] ABSTRACT

A transport for a rectangular tape cartridge enclosing a supply reel having a web of magnetic tape wound thereabout terminating in a free end attached to a leader block. The illustrated embodiment of the transport is designed to fit within the computer industry standard 5¼-inch form factor and utilizes the ½-inch tape cartridge defined in Proposed American National Standard X3B5/85-075. An elongate rectangular housing has internal mechanisms for supporting the tape cartridge therein and referencing the cartridge off its side surfaces. The cartridge is manually inserted into the housing through a slot in a face panel extending across a transverse end of the housing. Electro-mechanical assemblies lock the cartridge in place and complete the loading sequence by engaging a drive chuck with the hub of the supply reel, extracting the leader block from the cartridge, and pulling the leader block to the take-up hub to thread the tape along a tape path. A gear driven articulated arm has an outer end which is guided along a hook-shaped track and carries the leader block into engagement with a receptacle in the take-up hub. Precision transverse movement of a magnetic head in the tape path is accomplished by a stepper motor coupled to a band drive through a worm gear reduction.

30 Claims, 6 Drawing Sheets

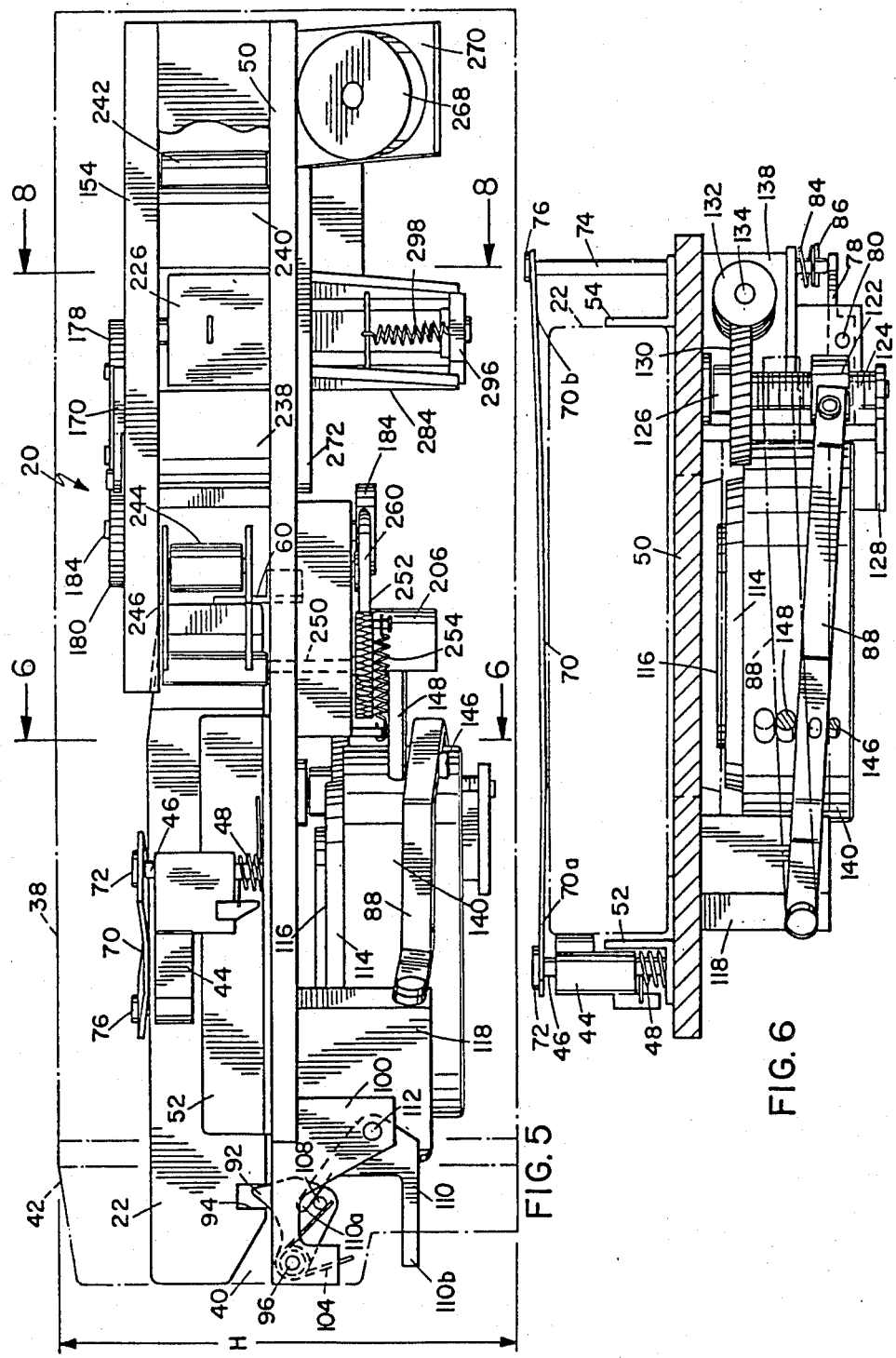

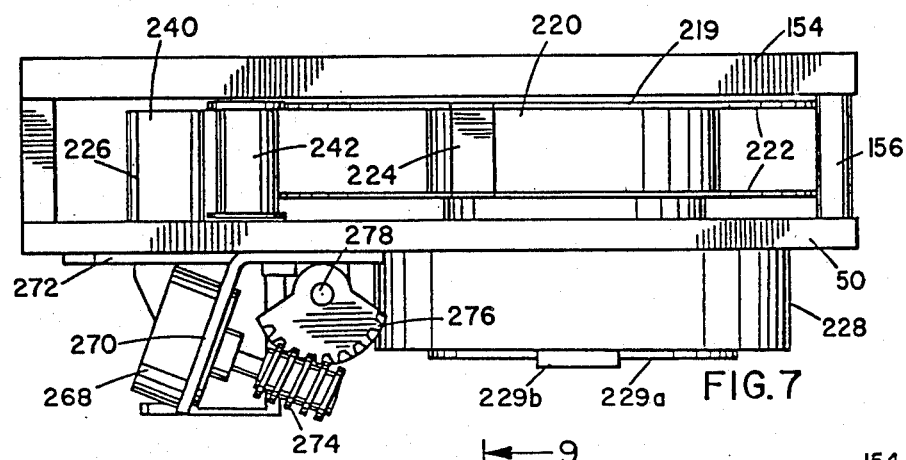
FIG. 7
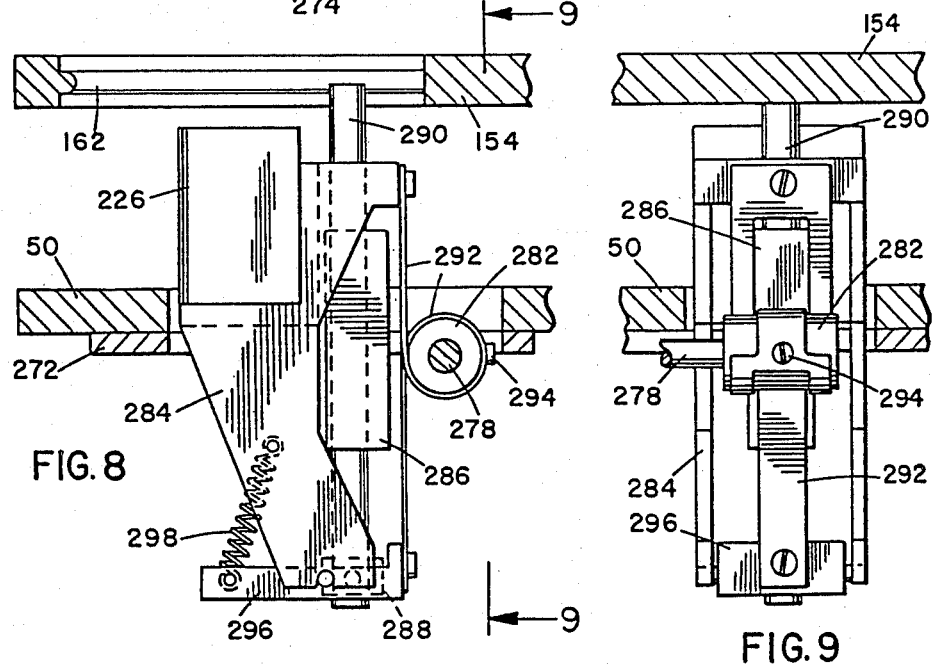
FIG. 8
FIG. 9

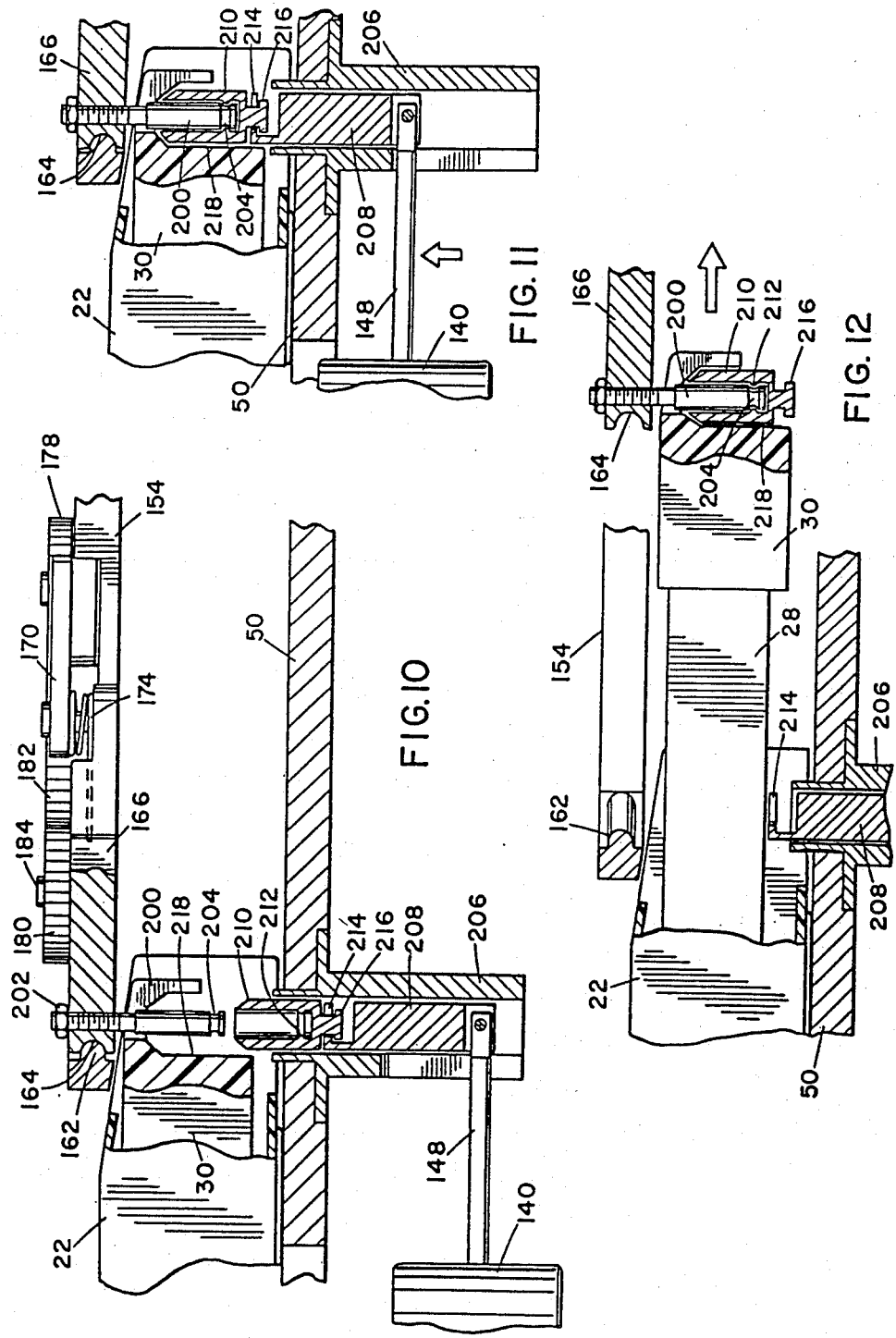

TRANSPORT FOR TAPE CARTRIDGE WITH LEADER BLOCK

This is a continuation of co-pending application Ser. No. 088,729 filed on Aug. 24, 1987 which in turn was a continuation of application Ser. No. 794,503 filed Nov. 1, 1985 and now U.S. Pat. No. 4,704,645.

BACKGROUND OF THE INVENTION

The present invention relates to tape transport mechanisms, and more particularly, to a transport into which a tape cartridge is inserted, and a tape leader block is extracted and pulled to a take-up hub to thread the tape past a read/write transducer.

Winchester disk drives provide minicomputer systems with substantial data storage capacity and rapid data access. It is desirable to incorporate into such minicomputer systems auxiliary storage devices which utilize removable media in order to permit data interchange, archival storage and back-up protection. In many cases floppy disk drives are inadequate as auxiliary storage devices because only a relatively small amount of data can be stored on a single floppy disk.

Streaming tape drives offer a cost-effective solution to the foregoing needs. They are designed to operate at high speeds, enabling the transfer of large blocks of data between Winchester disks and magnetic tape. Unlike start-stop tape drives which require costly electromechanical components to start and stop the tape quickly in the gaps between individual blocks of recorded data, streaming tape drives simulate the start-stop function through a repositioning technique which eliminates the need for such costly electro-mechanical components. Streaming tape drives have heretofore been commercialized in models utilizing ½-inch and ¼-inch magnetic tape. One example of such a drive is the FloppyTape (Trademark) drive sold by Cipher Data Products, Inc., the assignee of this application. It utilizes a dual-reel, ¼-inch tape cartridge defined by ANSI standard X3.55-1977. The transport of the aforementioned drive is disclosed in U.S. Pat. No. 4,573,091 which is also owned by the assignee of this application.

Another tape cartridge suitable for use in an auxiliary storage device is defined in Proposed American National Standard X3B5/85-075. That cartridge contains a single reel of magnetic tape including a leader block for interfacing with an automatic threading system. The cartridge is more fully described in U.S. Pat. Nos. 4,335,858; 4,334,656; 4,383,660 and 4,452,406 and in U.S. patent application Ser. Nos. 315,112 and 315,120, both filed on Oct. 26, 1981. Said cartridge is hereafter referred to as the "leader block tape cartridge".

Currently a large percentage of minicomputers are designed to physically incorporate 5 ¼-inch Winchester and 5 ¼-inch floppy disk drives. These disk drives are constructed to meet an industry standard which requires that they fit within a rectangular volume measuring approximately five and three-quarter inches in width by three and one-quarter inches in height by eight inches in length. The foregoing set of dimensions are referred to in the computer industry as the 5 ¼-inch form factor.

It would be desirable to provide a magnetic tape transport that would fit within the 5 ¼-inch form factor and utilize the aforementioned leader block tape cartridge. Such a transport could then be inserted into the same physical enclosure or receptacle in minicomputers sized to receive the 5 ¼-inch Winchester and floppy disk drives. The IBM (Trademark) 3480 tape drive which utilizes the aforementioned leader block tape cartridge has a relatively large transport that will not fit within the 5 ¼-inch form factor. It uses a stationary magnetic head and a mechanism for moving the cartridge perpendicular to its plane into engagement with a drive chuck. U.S. Pat. No. 4,334,656 discloses a relatively large transport for the leader block tape cartridge. U.S. Pat. No. 4,335,858 discloses a transport for a leader block tape cartridge in which a flexible sprocketed guide ribbon is disposed in a continuous guide channel to carry the leader block along the tape path. The cartridge is moved vertically into engagement with the supply reel drive mechanism.

The aforementioned leader block tape cartridge has an outer cartridge box measuring approximately four and one-quarter inches in width by four and seven-eighths inches in length by fifteen-sixteenths of an inch in height. Any transport utilizing the leader block tape cartridge must allow sufficient space for a take-up hub that will carry a tape pack diameter of approximately three and three-quarter inches. In addition, the transport must receive and lock the cartridge in place upon insertion, extract the leader block from the cartridge, automatically thread the tape past the transducer to the take-up hub, and engage a supply reel motor with the cartridge In addition, to obtain the desired data storage capacity such as 200 megabytes, data must be recorded serially on the tape in multiple tracks, e.g. twenty-four parallel tracks. Therefore a precision magnetic head positioning system is required.

Heretofore, persons skilled in the computer peripherals art believed that a tape transport for the leader block tape cartridge could not fit within the 5 ¼-inch form factor due to the relatively large size of the cartridge and the complexities involved in performing all the functions described above with a high degree of precision in such a confined space. The leader block tape cartridge and the take-up hub must be positioned in the same general plane. A skewed tape path which would result from mounting the supply reel and take-up hub in different planes would put undesirable stresses on the tape media which would contribute to error. The length of the 5 ¼-inch form factor is less than twice the length of the leader block tape cartridge and the width of the form factor is less than one and one-half times the width of the cartridge Accordingly, prior to our invention, nobody has been able to solve the space limitation problem inherent in attempting to fit a tape transport for the leader block tape cartridge into the 5 ¼-inch form factor Also, the tolerances for tape guidance, azimuth control and head position control become extremely critical at the data densities required to store 200 megabytes or more of data onto the cartridge.

SUMMARY OF THE INVENTION

It is the primary object of the present invention to provide a tape transport that utilizes the leader block tape cartridge defined in Proposed American National Standard X3B5/85-075.

It is another object of the present invention to provide a tape transport of the aforementioned type that will fit within the industry standard 5 ¼-inch form factor.

It is another object of the present invention to provide a tape transport of the aforementioned type that is capable of achieving data storage capacities of at least 200 megabytes.

It is another object of the present invention to provide a tape transport of the aforementioned type in which leader block tape cartridges can be interchanged between transports and the data reliable read therefrom.

It is another object of the present invention to provide a tape transport of the aforementioned type which achieves very close tolerances for tape guidance, azimuth control and head position control.

It is another object of the present invention to provide a tape transport of the aforementioned type in which the leader block tape cartridge is manually-inserted by the user and thereafter locked into position relative to three mounting planes to ensure proper leader block extraction, auto-threading and tape path control.

It is another object of the present invention to provide a tape transport of the aforementioned type in which a drive chuck is moved into engagement with the supply reel hub after insertion of the leader block tape cartridge.

It is another object of the present invention to provide a tape transport of the aforementioned type having a precision magnetic head positioner.

The illustrated embodiment of our transport is designed to fit within the computer industry standard 5 ¼-inch form factor and utilizes the ½-inch tape cartridge defined in Proposed American National Standard X3B5/85-075. An elongate rectangular housing has internal mechanisms for supporting the tape cartridge therein and referencing the cartridge off its side surfaces. The cartridge is manually inserted into the housing through a slot in a face panel extending across a transverse end of the housing. Electro-mechanical assembles lock the cartridge in place and complete the loading sequence by engaging a drive chuck with the hub of the supply reel, extracting the leader block from the cartridge, and pulling the leader block to the take-up hub to thread the tape along a tape path. A gear driven articulated arm has an outer end which is guided along a hook-shaped track and carries the leader block into engagement with a receptacle in the take-up hub. Precision transverse movement of a magnetic head in the tape path is accomplished by a stepper motor coupled to a band drive through a worm gear reduction.

BRIEF DESCRIPTION OF THE DRAWINGS

FIG. 5 is a side elevation view of the preferred embodiment of our tape transport with portions of its overall housing illustrated in phantom lines.

FIG. 6 is a vertical sectional view taken along line 6—6 of FIG. 5 illustrating the mechanisms for moving the supply reel motor and drive chuck assembly into and out of driving engagement with the supply reel hub of the leader block tape cartridge.

FIG. 7 is a rear end elevation view of the preferred embodiment of our tape transport.

FIG. 8 is an enlarged vertical sectional view taken along line 8—8 of FIG. 5 providing a side elevation view of a portion of the magnetic head positioner mechanism of the preferred embodiment of our tape transport.

FIG. 9 is a sectional view taken along line 9—9 of FIG. 8 providing a rear elevation view of a portion of the magnetic head positioner.

FIG. 10 is an enlarged vertical sectional view taken along line 10—10 of FIG. 1 illustrating the starting positions of the articulated threading arm and tape leader block capture mechanisms relative to the loaded tape cartridge.

FIG. 11 is a view similar to FIG. 10 illustrating the capturing of the tape leader block.

FIG. 12 is a view similar to FIGS. 10 and 11 illustrating the extraction of the tape leader block and tape from the cartridge by the moving of the articulated arm along its track toward the take-up hub.

DESCRIPTION OF THE PREFERRED EMBODIMENT

Figure 1:
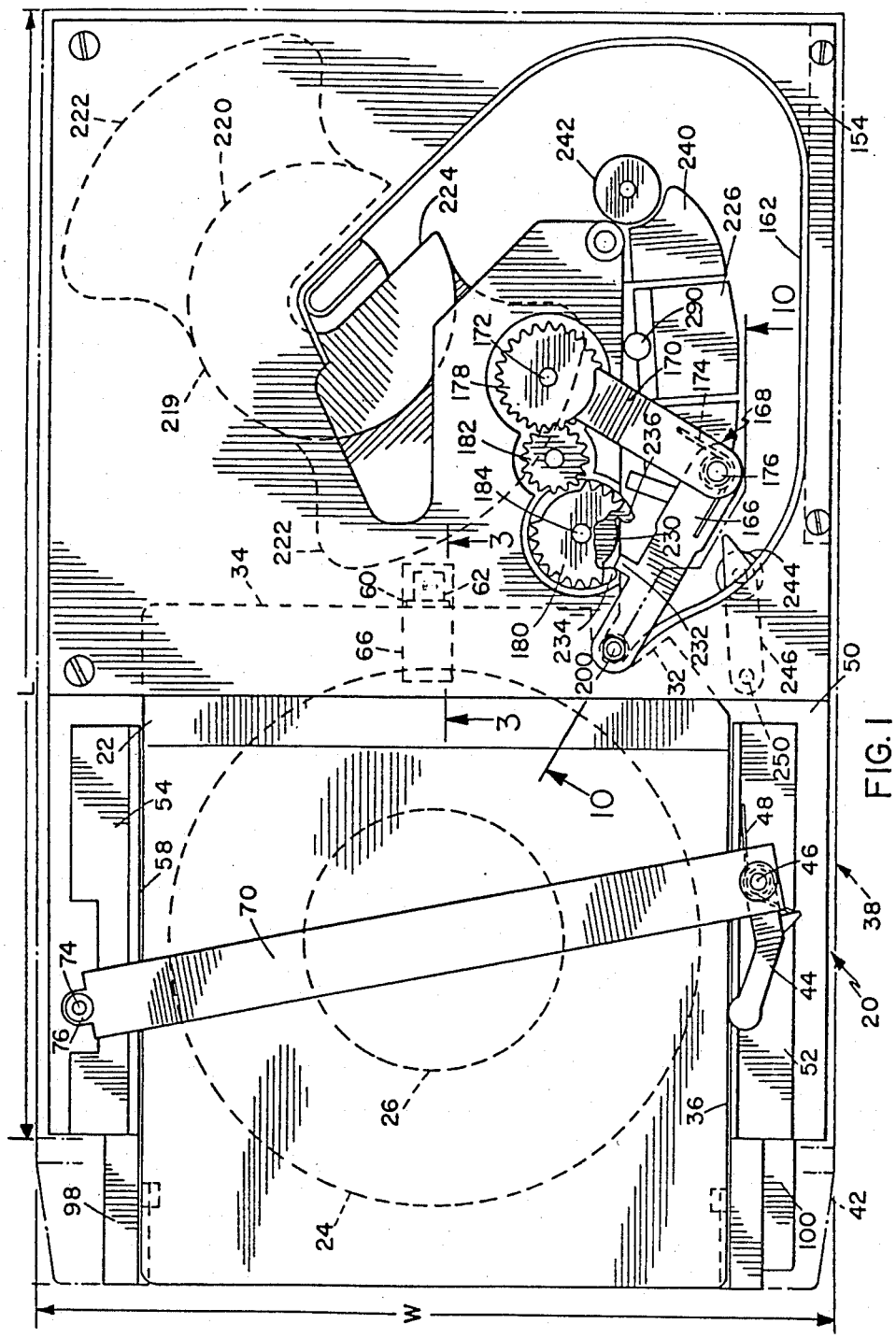
FIG. 1 is a top plan view of a preferred embodiment of our tape transport illustrating the loaded position of the leader block tape cartridge.

Referring to FIG. 1, the preferred embodiment 20 of our tape transport is illustrated with a leader block tape cartridge 22 fully inserted therein. The tape cartridge is of the type defined by Proposed American National Standard X3B5/85-075. .The cartridge has an outer rectangular housing which encloses a supply reel 24 having a hub 26 with a length of one-half inch magnetic tape 28 (FIG. 12) wound thereabout. The free end of the magnetic tape is attached to a leader block 30 normally sealed in a corner 32 of the cartridge between a forward edge 34 (FIG. 1) and a side edge 36 thereof. The cartridge housing measures approximately 125 millimeters (4 ⅞ inches) in length (measured left to right in FIG. 1) by 109 millimeters (4 ¼ inches) in width (measured up and down in FIG. 1) and 24.5 millimeters (15/16 of an inch) in height (measured up and down in FIG. 10).

The transport 20 (FIG. 1) is designed to meet the industry standard 5 ¼ inch form factor. It includes an elongate, generally rectangular housing or frame 38 having a length L of approximately eight inches, a width W of approximately five and three-quarter inches and a height H (FIG. 5) of approximately three and one-quarter inches. The cartridge is inserted into the housing through a slot 40 in a face panel or bezel 42 connected to the forward transverse end of the housing. The forward edge 34 (FIG. 1) of the cartridge enters the slot first and the side edge 36 of the cartridge is aligned generally parallel to the longitudinally extending side edge of the housing.

Thus, bearing in mind the foregoing dimensions of the leader block tape cartridge and the housing, it will be understood that the housing has a width less than one and one-half times the width of the cartridge, and the housing has a length less than two times the length of the cartridge. The housing is also only three and one-quarter inches in height. In this extremely confined space we have provided cartridge referencing and locking, leader block extracting, supply and take-up reel drive, auto-threading, and precision head moving mechanisms, as illustrated in drawings and explained in great detail hereafter.

Several surfaces of the cartridge 22 are engaged to register the cartridge with a predetermined reference plane. A positioner arm 44 (FIG. 5) pivoted about a vertical clamp rod 46 is biased by a torsion spring 48 against the side edge 36 of the cartridge. The bottom surface of the cartridge is supported by a rectangular horizontal base plate 50 which extends substantially the entire length and width of the housing 38 and serves as a central mounting chassis thereof. A pair of L-shaped brackets 52 and 54 (FIGS. 1 and 5) are mounted on either side of the base plate 50 and guide the opposite side edges of the cartridge as it is inserted into the housing. During this insertion, the positioner arm rotates counter-clockwise in FIG. 1 as its outer rounded end 56 is initially pushed out of the way, by the beveled corner of the cartridge. The positioner arm presses against the side edge 36 of the cartridge to force its opposite side edge 58 snugly against the L-shaped bracket 54.

Figure 3:
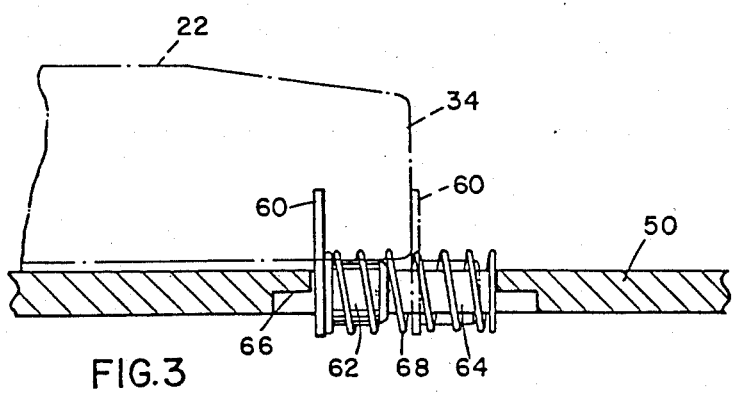
FIG. 3 is an enlarged vertical sectional view taken along line 3—3 of FIG. 1 illustrating the cartridge ejection mechanism.

Referring to FIGS. 1 and 3, a vertical stop plate 60 engages the forward edge 34 of the cartridge as it is inserted. The stop plate moves from an initial position illustrated in solid lines in FIG. 3 to a loaded position illustrated in phantom lines in FIG. 3 as the cartridge moves from left to right. The stop plate is affixed to a sleeve 62 which longitudinally reciprocates on a post 64 mounted in a cut-out 66 (FIG. 1) in the base plate 50. A coil spring 68 (FIG. 3) surrounding the sleeve and post is compressed upon insertion of the cartridge 22 in the housing to its fully loaded position and aids in ejecting the cartridge from the housing upon the release of cartridge locking mechanism hereafter described. This locking mechanism holds the cartridge snugly against the stop plate 60 in its loaded or retracted position illustrated in phantom lines in FIG. 3.

Figure 4:
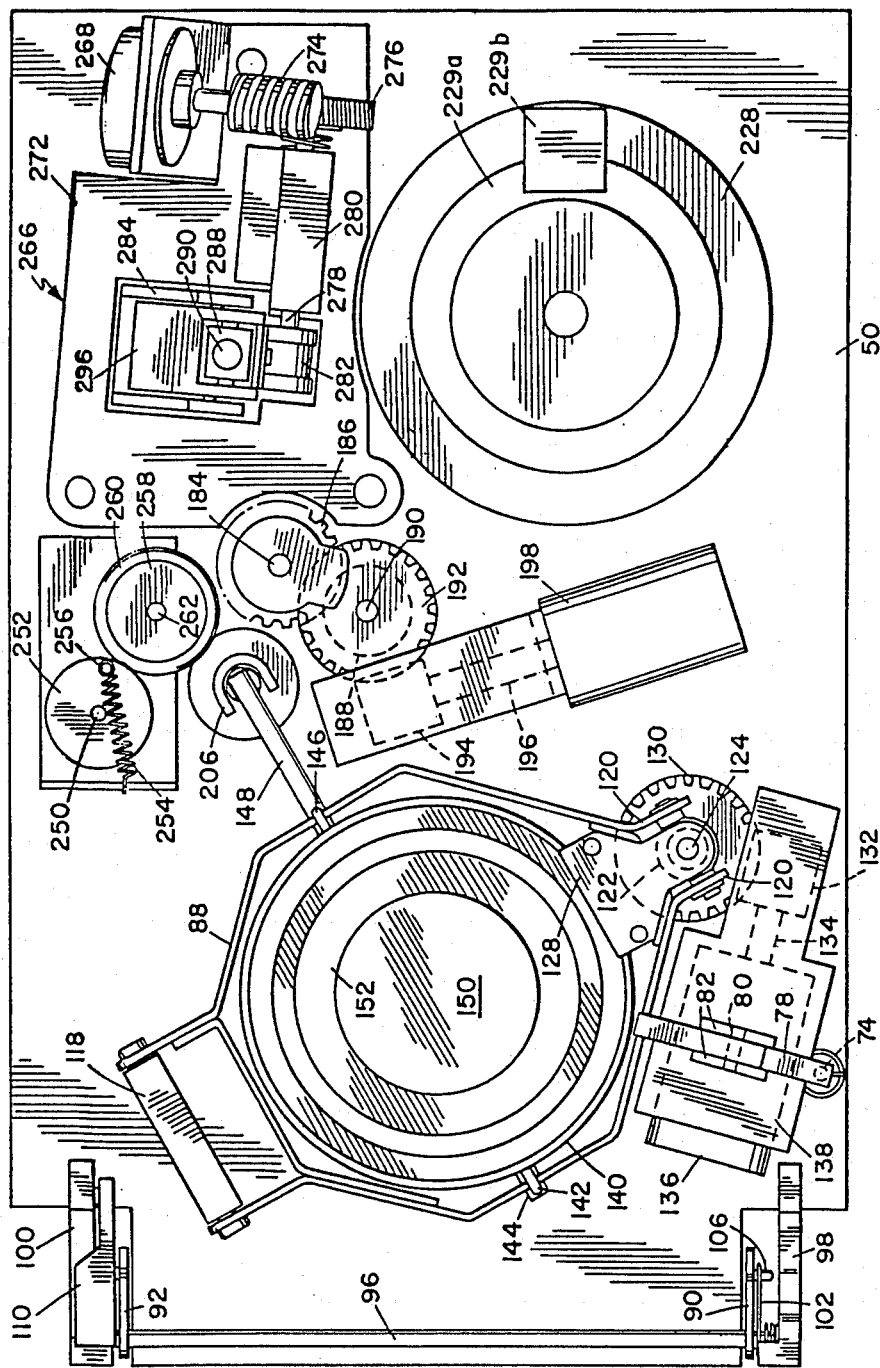
FIG. 4 is a plan view of the underside of the preferred embodiment of our tape transport.

A horizontally extending cross clamp 70 is releasably moved down into engagement with the upper surface of the cartridge to squeeze it against the base plate 50. One end 70a of the cross clamp has a hole through which extends the clamp rod 46 (FIG. 6). The hole is slightly larger than the diameter of the clamp rod 46 so that the end 70a can float between the upper edge of the positioner arm 44 and a head 72 of the rod. The other end 70b of the cross clamp is fixed to the upper end of a second clamp rod 74 by a retainer 76. The cross clamp 70 does not obstruct insertion of the cartridge because the positioner arm 46 supports its end 70a enough to keep it clear. The second clamp rod 74 extends through the base plate 50 and is vertically reciprocated by a rocker arm 78 pivoted about pin 80 journaled in flanges 82 (FIG. 4). A coil spring 84 surrounds the lower end of the rod 74 and is compressed between a pin 86 attached to the lower end of the clamp rod 74 and the underside of the base plate 50. When a lifting bail 88 of the supply reel drive mechanism hereafter described is raised to its position illustrated in phantom lines in FIG. 6, the rocker arm pivots clockwise from its position illustrated in FIG. 6. The spring 84 then pushes the rod 74 and the cross clamp 70 downwardly, squeezing the cartridge 22 against the base plate 50. When the lifting bail is lowered to disengage the supply reel drive mechanism, it pivots the rocker arm 78 counter-clockwise, which in turn pushes the second clamp rod 74 and cross clamp 70 upward to their positions illustrated in FIG. 6, releasing the cartridge so that it can be ejected.

The cartridge locking mechanism includes a pair of latches 90 and 92 (FIGS. 4 and 5) having pointed ends which are moved into recesses 94 (FIG. 5) formed in the side edges of the cartridge 22. The latches 90 and 92 are rigidly mounted to the opposite ends of a connecting bar 96 (FIG. 4). The bar 96 extends across the the forward transverse end of the housing 38 and its opposite ends are mounted for rotation in the outer ends of corresponding brackets 98 and 100 attached to the forward end of the base plate 50. Torsion springs 102 and 104 (FIGS. 4 and 5) surround the opposite ends of the connecting bar 96 and their legs engage pins 106 and 108 respectively on the latches 90 and 92 to urge the pointed ends of the latches upwardly into engagement with the recesses 94 of the loaded cartridge 22. A latch lever 110 (FIG. 5) rotates about an axle 112 journaled in the bracket so that one leg 110a thereof can push downwardly on the pin 108 to disengage both the latches 90 and 92 from the cartridge 22. The other end 110b of the latch lever may be pushed to the right in FIG. 5 to rotate the latch lever in a counter-clockwise direction by an eject button (not illustrated) which encloses the lever end 110b and is mounted for in and out reciprocation on the face panel 42.

A supply reel motor 114 (FIG. 4 and 5) is supported on the lifting bail 88 for vertical reciprocation. The output shaft of this motor (not visible) is rigidly coupled to a toothed drive chuck 116 (FIG. 5) adapted to engage the serrated hub (not illustrated) of of the supply reel mounted in the cartridge 22. The lifting bail 88 is hinged to a rear support block 118 (FIGS. 4 and 5) secured to the underside of the base 50. The forward ends 120 (FIG. 4) of the lifting bail are pivotally secured to a bail nut 122 which threads up and down a screw shaft 124 (FIG. 6). The opposite ends of this screw shaft are journaled in a bearing 126 and bracket 128 for rotation about a vertical axis. A spur gear 130 rigidly mounted on the screw shaft 124 is rotated by a worm gear 132 rigidly mounted to the output shaft 134 of a motor 136 (FIG. 4). The motor 136 is supported inside a mounting block 138 secured to the underside of the base plate 50. The flanges 82 which support the rocker arm 78 extend downwardly from the underside of the mounting block 138.

As illustrated in FIG. 6, the motor 136 can be energized to rotate the screw shaft 124 in opposite directions, thereby causing the bail nut 122 to thread up and down the shaft. This in turn moves the lifting bail and supply reel motor 114 between their raised and lowered positions illustrated in phantom and solid lines, respectively, in FIG. 6. The supply reel motor 114 is carried by a surrounding cylindrical jacket 140. As best seen in FIGS. 4 and 10, the arms of the lifting bail 88 extend between pins 142 and 144 extending from one side of the jacket and pin 146 and leader block actuator arm 148 extending from the other side of the jacket. As the supply reel motor is raised, the drive chuck 116 (FIGS. 5 and 6) is lifted into driving engagement with the supply reel hub through a circular cut-out (not visible) in the base plate 50. A chopper wheel 150 (FIG. 4) with a plurality of equally spaced apertures in its circumferential periphery 152 is mounted to the lower end of the supply reel motor shaft. The periphery 152 of the chopper wheel rotates between a photo emitter/detector combination (not illustrated) which produces electrical signals indicative of the amount of rotation of the supply reel.

The leader block extracting mechanism of our tape transport will now be described. Referring to FIGS. 1, 5 and 10, a horizontal top cover plate 154 made of DELRIN (Trademark) or other suitable rigid material is supported in spaced co-planar relationship with the rear half of the base plate 50. The base and cover plates are rigidly connected by four vertical spacer posts 156 (FIG. 7) into which screws such as 158 (FIG. 2) are threaded at each end. A hook or generally C-shaped cut out region 160 is formed in the top cover plate. The outer edge of the cut out region 160 is formed with a rounded rail 162 (FIGS. 2 and 8) defining a track. This track receives and guides the conformably shaped outer end 164 (FIG. 12) of the trailing arm 166 of a two-piece, articulated threading arm generally denoted 168 (FIG. 1). The trailing arm is pivotably connected to an inner or leading arm 170 whose inner end is rigidly mounted to the upper end of a shaft 172 which extends through the base and cover plates 50 and 154. Thus the shaft 172 and its support through the base and cover plates 50 and 154 provides a pivotal mounting assembly for the articulated threading arm 168. A torsion spring (FIG. 1) is wrapped around a pivot pin 176 connecting the leading and trailing arms 170 and 166. The opposite legs of this torsion spring are connected to the the leading and trailing arms for urging the outer end 164 (FIG. 12) of the trailing arm against the track formed by the rail 162 (FIG. 8) to insure positive guidance thereof.

Continuing with the description of the leader block extracting mechanism, a drive gear 178 (FIG. 1) rigidly connected with the shaft 172 and leading arm 170 is rotated by another drive gear 180 through an idler gear 182. The drive gear 180 is rigidly connected to the upper end of a shaft 184 which extends through the base and cover plates 50 and 154 for rotation about a vertical axis. Rotation of the shaft 184 is accomplished through a gear 186 (FIG. 4) rigidly connected to the lower end of the shaft 184. The gear 186 meshes with another gear 188 rigidly mounted on another rotatable shaft 190. Another gear 192 rigidly mounted on the shaft 190 meshes with a worm gear 194 rigidly connected to the output shaft 196 of another drive motor 198. The motor 198 can be selectively energized in either direction to rotate the leading arm 170 to pull the outer end of the trailing arm 166 from its leader block extraction position illustrated in FIG. 1 to its threaded position illustrated in FIG. 2.

The leader block extracting mechanism further includes a vertically extending leader block pin 200 (FIG. 10) whose upper threaded end is inserted in a hole in the outer end of the trailing arm 166 and secured by a nut 202. The lower un-threaded end of the leader block pin has an annular groove 204 formed therein. A hollow, cylindrical mounting post 206 extends downwardly from the base plate 50 directly beneath the location of the leader block pin 200 when it is located at the beginning of the track or rail 162 as illustrated in FIG. 1. A cylindrical locator plug 208 (FIG. 10) is mounted for vertical reciprocation within the mounting post 206. The plug 208 is connected to the outer end of the leader block actuator arm 148 which raises and lowers the plug as the supply reel drive mechanism is engaged and disengaged with the tape cartridge 22. A cylindrical deformable plastic plunger 210 is also mounted for vertical reciprocation into and out of the upper end of the hollow mounting post 206. The cylindrical interior of the plunger 210 is formed with an annular rib 212 for snap fitting into the annular groove 204 when the plunger is slid up over the leader block pin 200. The upper end of the locator plug 208 is provide with a fork or clevice 214 for semi-capture of a lug 216 on the formed on the lower end of the plunger 210. Movement of the articulated threading arm 168 away from its starting position illustrated in FIG. 1 when the plunger 210 is snapped over the leader block pin 200 will result in the plunger moving free from the clevice 214 as illustrated in the successive views of FIGS. 11 and 12. However, when the plunger is seated or captured in the clevice the locator plug 208 can be lowered to pull the plunger 210 off of the leader block pin 200.

The overall tape cartridge loading operation can now be described. Prior to insertion of the leader block tape cartridge 22 into the transport, the supply reel drive mechanism is in its lowered position illustrated in FIG. 5. The supply reel drive motor 114 is in the position illustrated in solid lines in FIG. 6 and the drive chuck 116 is below the upper surface of the base plate 50 leaving an unobstructed horizontal support surface for receiving the cartridge 22. The cartridge cross clamp 70 is also in its raised position illustrated in FIG. 6. The cartridge is inserted into the transport through the slot 40 (FIG. 5) in the face panel 42. The spring loaded latches 90 and 92 are pushed downwardly as the cartridge slides past. The spring loaded side positioner arm 44 is also pushed out of the way as the cartridge slides past. As the insertion of the cartridge continues, the spring loaded stop plate 60 (FIG. 1) engages the forward edge 34 of the cartridge and is pushed backward to its retracted position, compressing ejection spring 68. While this is taking place the latches 90 and 92 rise up into the corresponding recesses 94 (FIG. 5) in the side walls of the cartridge to lock the cartridge into place. At this time the articulated threading arm 168 is in its retracted or starting position illustrated in FIG. 1. The leader block 30 (FIG. 10) of the tape cartridge 22 is in its retracted position inside the corner 32 (FIG. 1) of the tape cartridge. When the cartridge comes to rest, after sliding left to right in FIG. 1, in its fully loaded position, the leader block pin 200 ends up being positioned inside a vertical, outwardly opening cylindrical aperture 218 (FIG. 10) in the leader block 30. (See cutout section 50 in U.S. Pat. No. 4,452,406).

Continuing with the description of the overall tape. cartridge loading operation, with the cartridge now fully inserted in the transport, a manually or automatically initiated command energizes motor 136 (FIG. 4) to cause the lifting bail 88 to raise the supply reel motor 114 and drive chuck 116. The drive chuck 116 engages the supply reel hub. The upward movement of the lifting bail 88 causes rocker arm 78 to pivot, allowing coil spring 84 (FIG. 6) to push clamp rod 74 downwardly. This in turn causes the cross clamp 70 to squeeze downwardly against the upper surface of the tape cartridge 22. The upward movement of the lifting bail 88 also causes arm 148 (FIG. 10) to raise the locator plug 208 and connected plunger 210. The plunger 210 is raised into the cylindrical aperture 218 and snaps over the leader block pin 200 as illustrated in FIG. 11. The motor 198 (FIG. 4) is then energized to rotate leading arm 170 (FIG. 1) in a counter-clockwise direction. The opening in the recess 218 in the leader block is large enough to permit free entry and exist of the naked leader block pin 200, but not the plunger 210. Therefore, when the trailing arm 166 pulls away from the cartridge it pulls the leader block 30 and the magnetic tape 28 with it, as illustrated in FIG. 12.

Figure 2:
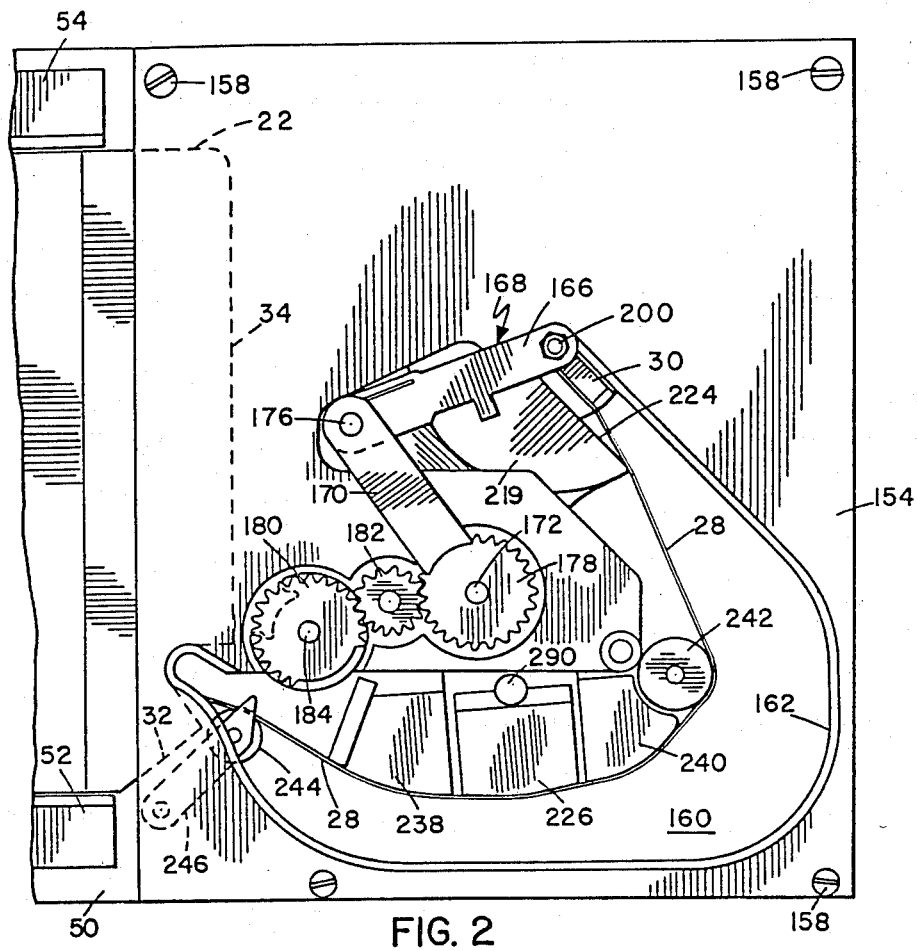
FIG. 2 is a top plan view of a rear portion of the tape transport of FIG. 1 illustrating the leader block engaged with the take-up hub after the gear driven articulated arm has extracted the leader block from the cartridge and pulled it along the tape path to the take-up hub.

Referring to FIG. 1, a take-up reel 219 comprising a hub 220 and upper and lower butterfly flanges 222 is mounted for rotation about a vertical axis between the base and top cover plates 50 and 154. The supply reel inside the cartridge 22 and the take-up reel thus rotate in the same general plane. The take-up hub has a radially extending, outwardly opening channel 224 formed therein into which the joined leader block pin 200, plunger 210 and leader block 30 are pulled by the articulated threading arm 168 as illustrated in FIG. 2. As the articulated threading arm 168 moves between its beginning and ending positions illustrated in FIGS. 1 and 2, respectively, the magnetic tape 28 from the cartridge is threaded past a magnetic read/write/erase transducer assembly 226 (FIG. 1), and generally along the tape path bounded by the cut out region 160 in the top cover plate 154. The take-up reel is rigidly mounted to the upper end of the shaft of a take-up drive motor 228 ( FIG. 7). A chopper wheel 229a (FIG. 4) is coupled to the lower end of the shaft of the take-up motor 228. A photo emitter/detector combination 229b through which the periphery of the chopper wheel 229a spins provides electrical signals representative of the angular position of the shaft of the take-up motor. Prior to the loading of the tape cartridge, the empty take-up reel is automatically positioned so that the channel 224 in the take-up hub is positioned as illustrated in FIG. 1, ready to receive the leader block 30 when it is pulled thereto by the articulated threading arm 168. When the articulated arm 168 is in its end or threaded position illustrated in FIG. 2, the take-up motor 226 can be energized to rotate the take-up reel 219. The vertical axis of the leader block pin 200 coincides with the rotational axis of the take-up hub so that the leader block 30 and plunger 210 positioned therein rotate inside the channel 224 about the pin 200. The magnetic tape 28 is then wound around the take-up hub 224.

When the tape cartridge 22 is to be withdrawn from the transport, the tape on the take-up reel is first rewound into the cartridge. The take-up reel is stopped in its position illustrated in FIG. 2 so that the leader block 30 can be extracted from the channel 224 in the take-up hub upon clockwise rotation of the leading are 170. Continued clockwise rotation of the leading arm results in the trailing arm 166 pulling the leader block 30 and terminal end of the magnetic tape 28 connected thereto back along the C-shaped track 162 to the position illustrated in FIG. 1. There the leader block is snapped back into the corner 32 of the tape cartridge. During this process the terminal end of the magnetic tape is rewound about the supply reel inside the tape cartridge.

The receptacle inside the corner 32 of tape cartridge that receives the-leader block 30 is formed so that the leader block snaps in place. The leader block must be pulled in a particular direction in order to be snapped out of the cartridge. Referring to FIG. 1, mounted on shaft 184 beneath gear 180, which is shown broken away, is a cam 230 having a peripheral recess in which a pawl 232 extending from the trailing arm 166 is received. Certain teeth are also missing from the periphery of the gear 180 as the correct angular location. When the threading arm 168 is in its beginning position illustrated in FIG. 1, the initial counter-clockwise turning of the gear 180 by the drive motor 198 causes the curved shoulder 234 of the cam 230 to engage the pawl 232 and pull the trailing arm 166 downward and to the right in FIG. 1. This unsnaps the leader block 30 from the tape cartridge 22 before the teeth of the gear 180 begin to mesh with those of the idler gear 182 which in turn rotates the gear 178 and the leading arm 170 in a clockwise direction. Upon rewinding of the tape, the teeth of the gear 180 disengage those of the idler gear 182 just as the leader block 30 gets near the final insertion location into the tape cartridge. The other shoulder 236 of the cam 230 then pushes the pawl 232 as the cam continues to rotate clockwise. This forces the end of the trailing arm 166 up and to the left in FIG. 1. This in turn forcefully snaps the leader block 30 in place. The foregoing linkage serves as a clutching arrangement to prevent overdriving the articulated threading arm 168 and damaging the guide track, threading arm, motor or gear train.

Referring to FIG. 2, the tape path includes tape guide blocks or chutes 238 and 240 mounted on either side of the transducer assembly 226. A tape guide: roller 242 is also mounted downstream of the guide block 240 for directing the magnetic tape 28 to the take-up reel. A movable tape guide roller 244 (FIG. 1) is mounted for articulated movement into engagement with the magnetic tape in advance of the lead tape guide block 238 after the leader block has been pulled past the same. Referring to FIG. 5, the guide roller is supported by an axle connected at its ends to upper and lower arms 246. The inner ends of these arms are rigidly connected to a vertical post 248 rigidly connected to the upper end of a shaft 250 which extends through the base plate 50. A knurled disk 252 is rigidly connected to the lower end of the shaft 250, beneath the base plate 50. A coil spring 254 (FIG. 4) is connected between a eccentric pin 256 on the knurled disk 252 and a bracket 258. The spring 254 biases the roller 244 toward the magnetic tape 28. A metal drive wheel 258 with a deformable outer tire 260 is mounted for rotation on a shaft 262 so that the tire is in driving engagement with the knurled disk 252. The upper end of the shaft 262 is connected to the base plate 50. A cam 264 is rigidly mounted on the shaft 184. This cam is specially configured and oriented to achieve the following drive action. The motor 198 initially rotates the shaft 184 a sufficient amount to cause the articulated threading arm to pull the leader block past the movable guide roller 244. Thereafter the cam 264 will engage the tire 260 to cause arms 246 to rotate and bring the guide roller 244 into contact with the magnetic tape to thereby establish the proper tape wrap angle. When the leader block is pulled back to the tape cartridge by the articulated arm, a reverse drive action takes place to swing the movable guide roller 244 clear of the tape path, clearing the way for the next threading operation on a subsequently loaded tape cartridge.

The precision magnetic head positioner mechanism 266 of our tape transport will now be described by way of reference to FIGS. 4, 7, 8 and 9. Briefly, the read/-write/erase transducer assembly 226 is supported and moved vertically up and down in precise, minute increments to access a selected one of a plurality of parallel data tracks, for example, twenty-four, extending longitudinally along the half-inch magnetic tape. A stepper motor 268 (FIG. 4) is mounted on an angularly bent segment 270 of a metal mounting plate 272 secured to the underside of the base plate 50. A worm gear 274 (FIG. 7) rigidly connected to the end of the shaft of the stepper motor meshes with a pinion gear segment 276 rigidly mounted to one end of a horizontal axle 278 (FIG. 4) rotatably journaled in an elongate bearing housing 280. A drum 282 (FIG. 8) is rigidly mounted to the other end of the axle 278.

Continuing with the description of the head positioner mechanism 266, the transducer assembly 226 (FIG. 8) is mounted on a carriage 284 supported on precision bearings 286 and 288 for vertical reciprocation along post 290. The intermediate portion of a nonelastic band 292 (FIGS. 8 and 9) made of, for example, metal foil is wrapped around the drum 282 and is secured thereto by set screw 294. The upper end of the metal band is secured to the upper portion of the carriage 284. The lower end of the metal band 292 is secured to one end of a lever 296 pivoted at the lower end of the carriage. A coil spring 298 connects the other end of the lever to the carriage body. It will be readily understood that selective energization of the stepper motor 268 will rotate the drum 282 to wind different portions of the metal band 292 about the drum to thereby reciprocate the carriage 284 and the transducer assembly 226 carried thereby.

The electronic circuitry for handling all the reading and writing of digital data to and from the magnetic tape and for communicating with the host computer may be carried on two rectangular printed circuit boards not illustrated. These boards may be mounted horizontally within the housing, one above the cartridge and take-up hub, and the other below the supply and take-up motors. By way of example, this circuitry may include an SCSI/QIC-02 I/F Controller Driver Chip, a 80188 16-bit microprocessor, 32K Bytes of CMOS EPROM, 8K Bytes of CMOS RAM, 64K Bytes of Tape Image Buffer, a tape image buffer controller chip, a write interface chip, a write driver, a read channel, a data separator, and a read interface chip. The circuitry may further include electronic components interconnected as is well known in the tape drive art to provide electro-mechanical interface with the reel motor drivers, head position stepper motor, chuck engage motor, threading motor driver, tachometer interface, sense switch interface and LED driver.

Our tape transport is capable of operating in a "streaming" mode, and may simulate fast acceleration start/stop tape drives as well. Our transport has no tape capstan. Instead, the currents to the supply and take-up motors are controlled as is well known in the art to maintain constant tape tension. See U.S. Pat. No. 4,125,881 of Eige et al., entitled "Tape Motion Control for Reel-To-Reel Drive", the disclosure of which is specifically incorporated herein by reference. See also U.S. Pat. No. 4,500,965 of Gray, entitled "Capstanless Magnetic Tape Drive with Electronic Equivalent to Magnetic Tape" the disclosure of which is specifically incorporated herein by reference.

Our tape transport, when equipped with electronics such as those briefly summarized above, may provide a storage capacity, on the Proposed ANSI X3B5/85-075 one-half inch leader block tape cartridge, of 200 megabytes of formatted data.

In summary, we have designed a tape transport for the referenced leader block tape transport that will fit within the industry standard 5 ¼ inch form factor, while still providing all the essential functions to allow reliable reading and writing of data at extremely high densities and permitting interchangeability of cartridges between various drives. This is achieved by the physical layout and arrangement of the components of the system as clearly illustrated in FIG. 1 of the drawings. The cartridge is mounted in a forward portion of the housing, generally forward of a transverse centerline of the housing. The take-up reel, the magnetic head and the tape extracting and threading mechanisms are all confined to a rear portion of the housing behind the transverse centerline thereof. The take-up reel is mounted for rotation about an axis to one side of a longitudinal centerline of the housing, with the magnetic head and tape extracting and threading mechanism confined to a rear quadrant of the housing adjacent to, but on the opposite side of the longitudinal centerline from said take-up reel. Thus, our invention enables small computer owners to have a device that provides extremely cost effective, reliable mass data storage for data interchange, archival storage and back-up protection.

Having described a preferred embodiment of our tape transport it should be apparent to those skilled in the art that our invention may be modified in both arrangement and detail. Therefore, the protection on afforded our invention should only be limited in accordance with the scope of the following claims.

We claim:

1. A transport for a leader lock tape cartridge, comprising:

generally rectangular means having a length less than twice a length of the cartridge and a width less than one and one-half times a width of the cartridge for substantially receiving and supporting the cartridge therein;

a take-up hub;

means for rotatably supporting the take-up hub inside the cartridge receiving and supporting means in a common plane with a supply reel within said cartridge;

a magnetic tape transducer assembly mounted inside the cartridge receiving and supporting means between said cartridge and take-up hub;

a supply reel motor mounted inside the cartridge receiving and supporting means;

means for providing a first driving connection between the supply eel motor and supply reel inside the cartridge;

a take-up motor mounted inside the cartridge receiving and supporting means;

means for providing a second driving connection between the take-up motor and the take-up hub; and means confined substantially within a lateral space about equal to that occupied by said said take-up hub for extracting a leader block from the cartridge and threading a length of tape connected to the leader block past the transducer assembly to the take-up hub.

2. A transport according to claim 1 and further comprising means for moving the first driving connection means into and out of engagement with the supply reel when the cartridge is supported substantially in the cartridge receiving and supporting means.

3. A transport according to claim 1 and further comprising means for moving the transducer assembly in a transverse direction relative to a longitudinal dimension of the length of tape in order to select one of a plurality of data tracks on the tape.

4. A transport according to claim 1 and further comprising manually releasable means for locking the cartridge in position when the cartridge is supported substantially in the cartridge receiving and supporting 5. A transport according to claim 1 wherein the leader block extracting and tape threading means includes an articulated arm, means for mounting the articulated arm for rotation within the cartridge receiving and supporting means, track means mounted within the cartridge receiving and supporting means for guiding an outer end of the articulated arm between the cartridge and the take-up hub, means connected to the outer end of the articulated arm for holding the leader block, means for causing the holding means to extract the leader block from the cartridge, and means for for causing the arm to rotate to thereby pull the leader block to the take-up hub and thread the tape connected thereto past the transducer assembly.

6. A transport according to claim 1 and further comprising a bezel connected to a forward transverse end of the cartridge receiving and supporting means and defining a slot through which the cartridge is inserted into the cartridge receiving and supporting means.

7. A transport according to claim 2 wherein the cartridge receiving and supporting means includes a set of surfaces for engaging the cartridge to thereby register the cartridge with a predetermined reference plane.

8. A transport according to claim 1 wherein the cartridge measures approximately four and one-quarter inches in width by four and seven-eighths inches in length by fifteen-sixteenths of an inch in height and the cartridge receiving and supporting means will substantially fit within a five and one-quarter inch form factor.

9. A transport according to claim 8 wherein the take-up hub is mounted within the cartridge receiving and supporting means a sufficient distance from the cartridge when the cartridge is received therein so that the take-up hub can carry a tape pack having a diameter of approximately three and three-quarter inches.

10. A transport according to claim 1 and further comprising:
a tape guide;
means for mounting the tape guide for rotation inside the cartridge receiving and supporting means; and
means for rotating the tape guide into engagement with the tape after the leader block has been pulled past the transducer assembly.

11. A transport for a leader block tape cartridge, comprising:
generally rectangular means having a length less then twice a length of the cartridge and a width less than one and one-half times a width of the cartridge for substantially receiving and supporting the cartridge in a forward one-half thereof;
a take-up hub;
means for rotatably supporting the take-up hub inside the cartridge receiving and supporting means in a common plane with a supply reel within the cartridge;
a magnetic tape transducer assembly mounted inside the cartridge receiving and supporting means between the cartridge and the take-up hub;
a supply reel motor mounted inside the cartridge receiving and supporting means;
means for providing a first driving connection between the supply reel motor and the supply reel inside the cartridge;
a take-up motor mounted inside the cartridge receiving and supporting means;
means for providing a second driving connection between the take-up motor and take-up hub; and
means confined substantially within a rear quadrant of the cartridge receiving and supporting means for extracting a leader block from the cartridge and threading a length of tape connected to the leader block past the transducer assembly to the take-up hub.

12. A transport according to claim 11 and further comprising means for moving the first driving connection means into and out of engagement with the supply reel when the cartridge is supported substantially in the cartridge receiving and supporting means.

13. A transport according to claim 11 and further comprising means for moving the transducer assembly in a transverse direction relative to a longitudinal dimension of the length of tape in order to select one of a plurality of data tracks on the tape.

14. A transport according to claim 11 and further comprising manually releasable means for locking the cartridge in position when the cartridge is supported substantially in the cartridge receiving and supporting means.

15. A transport according to claim 11 wherein the leader block extracting and tape threading means includes an articulated arm, means for mounting the articulated arm for rotation within the cartridge receiving and supporting means, track means mounted within the cartridge receiving and supporting means for guiding an outer end of the articulated arm between the cartridge and the take-up hub, means connected to the outer end of the articulated arm for holding the leader block, means for causing the holding means to extract the leader block from the cartridge, and means for causing the arm to rotate to thereby pull the leader block to the take-up hub and thread the tape connected thereto past the transducer assembly.

16. A transport according to claim 11 and further comprising a bezel connected to a forward transverse end of the cartridge receiving and supporting means and defining in slot through which the cartridge is inserted into the cartridge receiving and supporting means.

17. A transport according to claim 11 wherein the cartridge receiving and supporting means includes a set of surfaces for engaging the cartridge to thereby register the cartridge with a predetermined reference plane.

18. A transport according to claim 11 wherein the cartridge measures approximately four and one-quarter inches in width by four and seven-eighths inches in length by fifteen-sixteenths of an inch in height and the cartridge receiving and supporting means will substantially fit within a five and one-quarter inch form factor.

19. A transport according to claim 18 wherein the take-up hub is mounted within the cartridge receiving and supporting means a sufficient distance from the cartridge when the cartridge is received therein so that the take-up hub can carry a tape pack having a diameter of approximately three and three-quarter inches.

20. A transport according to claim 11 and further comprising:
a tape guide;
means for mounting the tape guide for rotation inside the cartridge receiving and supporting means; and
means for rotating the tape guide into engagement with the tape after the leader block has been pulled past the transducer assembly.

21. A transport for a leader block tape cartridge, comprising:
a generally rectangular frame having a length less then twice a length of the cartridge and a width less than one and one-half times a width of the cartridge for substantially receiving and supporting the cartridge in a forward one-half thereof;
a supply reel motor mounted to the frame;
a first drive linkage removably connectable between the supply reel motor and a supply reel inside the cartridge;
a take-up motor mounted to the frame;

a take-up hub;

a second drive linkage connected between the take-up motor and take-up hub;

a magnetic tape transducer assembly mounted to the frame between the take-up hub and the cartridge when the cartridge is inserted in the frame; and a tape threading mechanism confined substantially within a rear quadrant of the frame for extracting a leader block from the cartridge and threading a length of tape connected to the leader block past the transducer assembly to the take-up hub.

22. A transport according to claim 21 and further comprising a lifting mechanism for moving the first driving connection into and out of engagement with the supply reel when the cartridge is supported substantially inside the frame.

23. A transport according to claim 21 and further comprising a positioner for moving the transducer assembly in a transverse direction relative to a longitudinal dimension of the length of tape in order to select one of a plurality of data tracks on the tape.

24. A transport according to claim 21 and further comprising manually releasable lock for holding the cartridge in position when the cartridge is supported substantially inside the frame.

25. A transport according to claim 21 wherein the tape threading mecahnism includes an articulated arm, a pivot assembly rotatably mounting the articulated arm to the frame, a track mounted to the frame for guiding an outer end of the articulated arm between the cartridge and the take-up hub, a leader block holder connected to the outer end of the articulated arm for extracting the leader block from the cartridge, and a threading drive for rotating the arm to thereby pull the leader block to the take-up hub and thread the tape connected thereto past the transducer assembly.

26. A transport according to claim 21 and further comprising a bezel connected to a forward transverse end of the frame and defining a slot through which the cartridge is inserted into the frame.

27. A transport according to claim 21 wherein the frame includes a set of surfaces for engaging the cartridge to thereby register the cartridge with a predetermined reference plane.

28. A transport according to claim 21 wherein the cartridge measures approximately four and one-quarter inches in width by four and seven-eighths inches in length by fifteen-sixteenths of an inch in height and the frame will substantially fit within a five and one-quarter inch form factor.

29. A transport according to claim 28 wherein the take-up hub is mounted relative to the frames sufficient distance from the cartridge when the cartridge is received therein so that the take-up hub can carry a tape pack having a diameter of approximately three and three-quarter inches.

30. A transport according to claim 21 and further comprising:

a tape guide;

a pivot mounting the tape guide to the frame for rotation into engagement with the tape after the leader block has been pulled past the transducer assembly; and a mechanism for rotating the tape guide into engagement with the tape after the leader block has been pulled past the transducer assembly.

* * * * *

UNITED STATES PATENT AND TRADEMARK OFFICE
CERTIFICATE OF CORRECTION

PATENT NO. : 4,809,099

DATED : February 28, 1989

INVENTOR(S) : Murphy, et al.

It is certified that error appears in the above-identified patent and that said Letters Patent is hereby corrected as shown below:

In Claim 1, column 12, line 33, change "eel" to --reel--.

Signed and Sealed this

Twenty-first Day of August, 1990

Attest:

HARRY F. MANBECK, JR.

*Attesting Officer*

*Commissioner of Patents and Trademarks*